United States Patent [19]
Hyatt, Jr. et al.

[11] Patent Number: 6,005,487
[45] Date of Patent: Dec. 21, 1999

[54] ELECTRONIC SECURITY SYSTEM WITH NOVEL ELECTRONIC T-HANDLE LOCK

[75] Inventors: Richard G. Hyatt, Jr., Shwasville; Charles E. Hall, Salem; Douglas Trent, Roanoke, all of Va.

[73] Assignee: Medeco Security Locks, Inc., Salem, Va.

[21] Appl. No.: 08/026,781

[22] Filed: Mar. 5, 1993

Related U.S. Application Data

[63] Continuation-in-part of application No. 07/865,849, Apr. 9, 1992, Pat. No. 5,745,044, which is a continuation-in-part of application No. 07/522,017, May 11, 1990, Pat. No. 5,140, 317.

[51] Int. Cl.$^6$ ....................................... H04Q 1/00
[52] U.S. Cl. ............................... 340/825.31; 340/825.35; 70/278; 70/472; 221/7
[58] Field of Search .................. 340/825.31, 825.34, 340/825.35; 70/208, 278, 279, 472, 469; 221/2, 6, 7

[56] References Cited

U.S. PATENT DOCUMENTS

| | | | |
|---|---|---|---|
| 3,337,992 | 8/1967 | Tolson | 340/533 |
| 3,500,326 | 3/1970 | Benford . | |
| 3,656,145 | 4/1972 | Proops | 340/825.35 |
| 3,660,624 | 5/1972 | Bell | 200/44 |
| 3,812,403 | 5/1974 | Gartner | 340/825.31 |
| 3,926,021 | 12/1975 | Genest et al. | 70/278 |
| 4,031,434 | 6/1977 | Perron et al. | 361/172 |
| 4,369,442 | 1/1983 | Werth | 340/825.35 |
| 4,438,426 | 3/1984 | Adkins | 340/64 |
| 4,594,637 | 6/1986 | Falk | 361/172 |
| 4,646,080 | 2/1987 | Genest et al. | 340/825.31 |
| 4,686,358 | 8/1987 | Seckinger et al. | 235/382 |
| 4,697,171 | 9/1987 | Suh | 340/543 |
| 4,736,970 | 4/1988 | McGourty | 70/469 |
| 4,738,334 | 4/1988 | Weishaupt | 180/287 |
| 4,742,426 | 5/1988 | Lavelle | 361/171 |
| 4,789,859 | 12/1988 | Clarkson et al. | 340/825 |
| 4,810,861 | 3/1989 | Herriott et al. | 235/382 |
| 4,829,296 | 5/1989 | Clark et al. | 340/825.31 |
| 4,835,407 | 5/1989 | Kataoka et al. | 307/10.5 |
| 4,864,292 | 9/1989 | Nieuwkoop | 340/825.31 |
| 4,868,409 | 9/1989 | Tanaka et al. | 307/10.5 |
| 4,870,400 | 9/1989 | Downs et al. | 340/825.31 |
| 4,962,449 | 10/1990 | Schlesinger | 364/200 |
| 5,018,375 | 5/1991 | Tully | 70/472 |
| 5,038,588 | 8/1991 | Hall | 70/208 |
| 5,040,391 | 8/1991 | Lin | 70/472 |
| 5,212,972 | 5/1993 | Kincaid | 70/208 |

FOREIGN PATENT DOCUMENTS

| | | |
|---|---|---|
| 243586 | 11/1987 | European Pat. Off. . |
| 2158870 | 11/1985 | United Kingdom . |
| 8902507 | 3/1989 | WIPO . |

*Primary Examiner*—Brian Zimmerman
*Attorney, Agent, or Firm*—Rothwell, Figg, Ernst & Kurz

[57] ABSTRACT

An electronic security system includes an electronic lock mechanism and an electronic key, each of which is provided with a microprocessor controller and a memory storing data including an ID code and encryption key codes. The lock microprocessor may either change ID codes stored in its memory or encrypt a seed number to be used for determining access to the lock. The key can only be used to access the lock either once or for a limited number of successive times, and must thereafter be reprogrammed by a host computer to be loaded with either the proper ID code or the appropriate encryption key code for that lock. The electronic lock operates a solenoid which retracts a bolt-blocking mechanism that prevents the unlocking of the bolt even when a key having the correct mechanical key cuts is inserted into the lock. Power for operating the electronic lock as well as the solenoid is provided by a power supply within the key. In a preferred embodiment the key unit is composed of a hand-held computer with a separate internal circuit board which stores key code information and performs encryption/decryption functions. A novel electronic T-lock assembly is also provided for use with vending machines and the like.

10 Claims, 15 Drawing Sheets

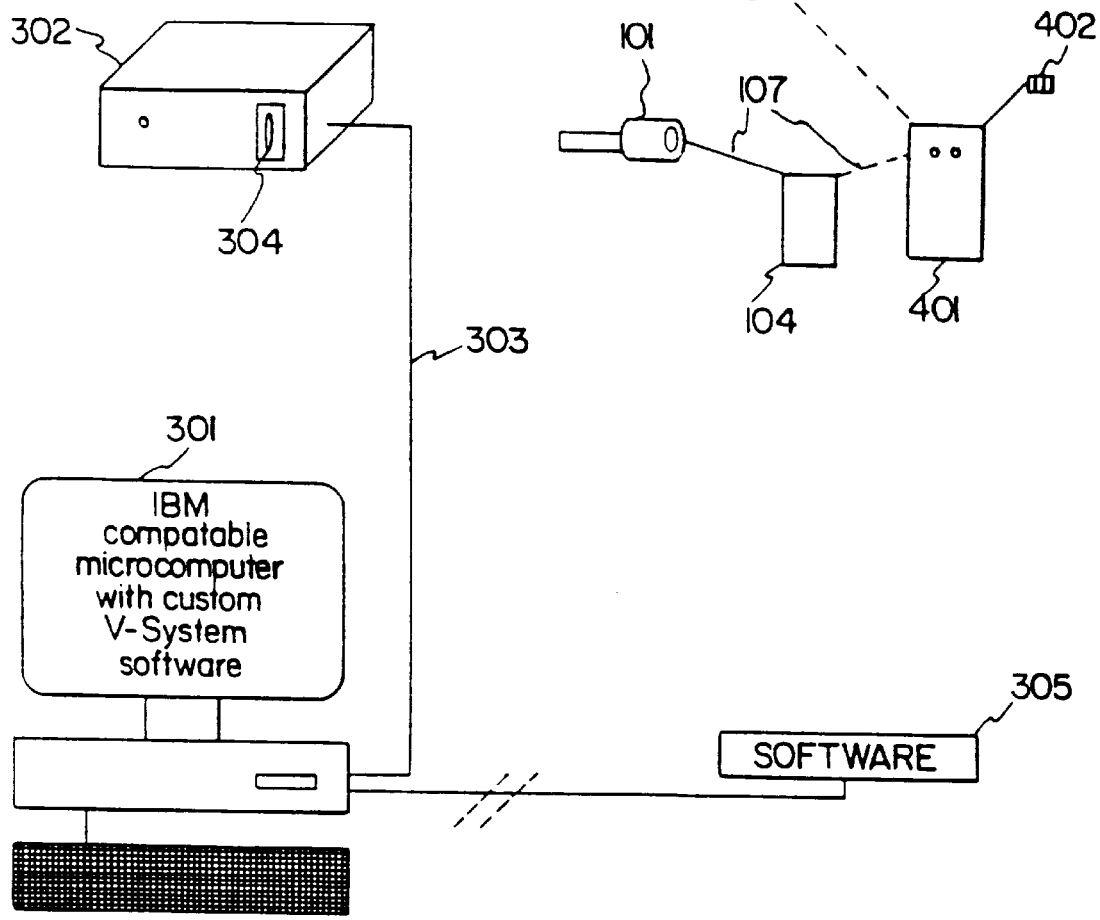

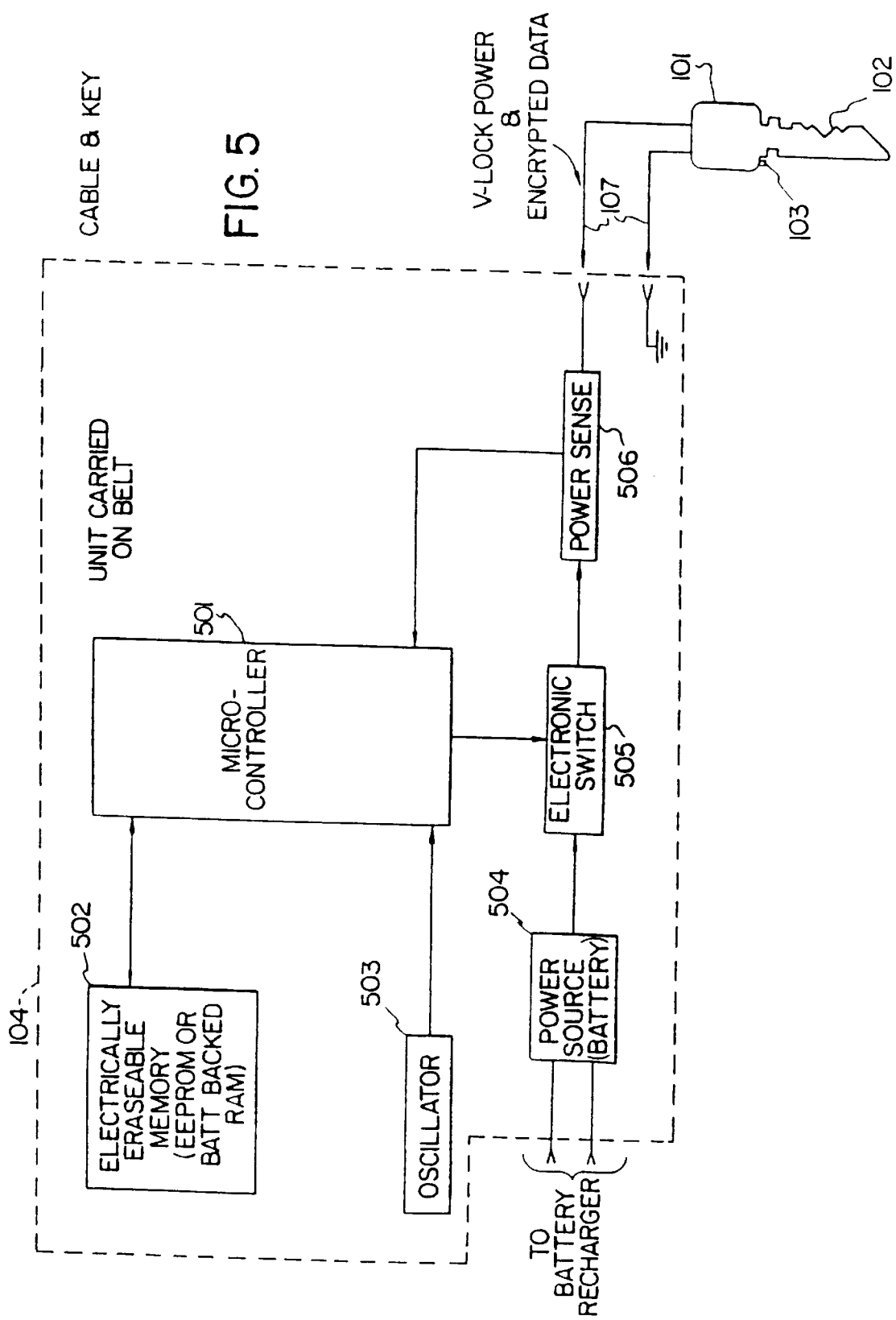

ELECTRONIC SECURITY SYSTEM WITH NOVEL ELECTRONIC T-HANDLE LOCK

This application is a continuation-in-part of application Ser. No. 07/865,849, filed Apr. 9, 1992, now U.S. Pat. No. 5,745,044 which is a continuation-in-part of application Ser. No. 08/522,017 filed May 11, 1990, now U.S. Pat. No. 5,140,317.

BACKGROUND OF THE INVENTION

1. Field of the Invention

This invention relates generally to electronic security systems, and more particularly to electronic security systems for money-containing devices such as pay telephones, vending machines, bill changers or the like, which must be periodically accessed by a collector in order to retrieve the funds accumulated in the device.

2. Background and Prior Art

Typically, the collection of money from coin or currency operated devices such as pay telephones, transit system fare card machines or the like is a costly and burdensome operation. For instance, a company may own tens or even hundreds of thousands of pay telephones for which tens or hundreds of thousands of keys must be kept in order to prevent the loss of a key from requiring the changing of locks on thousands of devices which would operate with the lost key.

Another problem involved with the collection of funds from currency operated devices is the possibility of fraud or theft by a collector. Typically, a collector should remove a locked coin box from the device and replace it with an empty lock box to which he does not have access. However, it is possible that a removed coin box will not be replaced with another lock box but rather will be replaced with an unlocked receptacle which can be later removed by that collector before turning in his key at the end of the collection shift.

Yet another cost involved in the collection process is the sheer manpower required for the task of distributing, collecting, and keeping track of many thousands of keys on a daily basis.

Although electronic security systems are known and have been used for various purposes, see e.g. U.S. Pat. Nos. 4,789,859, 4,738,334, 4,697,171, 4,438,426, applicants are unaware of any which specifically address the problems, noted above.

SUMMARY OF THE INVENTION

The present invention provides an electronic security system which overcomes the problems mentioned above and significantly reduces collection costs.

The present invention also provides an electronic security system which eliminates the requirement of costly rekeying in the event of a key loss.

The present invention further provides an electronic security system which substantially eliminates the possibility of internal fraud and theft.

This invention is an electronic security system comprising a lock including a bolt movable between a locked and an unlocked position, a key actuated lock cylinder having a bolt cam in contact with said bolt to prevent the bolt from moving when in a locked position, and operable upon actuation to move the bolt to the unlocked position, a retractable locking means for preventing the bolt from moving to the unlocked position when unretracted and allowing the bolt to be moved to the unlocked position when retracted, an electrically powered solenoid operable to retract the blocking means upon switching of power thereto, a microprocessor for controlling the switching of power to the solenoid, and a memory coupled to the microprocessor storing coded data. to the solenoid, and a memory coupled to the microprocessor storing coded data.

The invention further includes key means insertable into the lock cylinder for supplying power to the solenoid to retract the blocking means and for actuating the lock cylinder to move the bolt to the unlocked position, including a power supply for supplying power to the solenoid, a controller, a memory storing coded data, and means for establishing electrical connection between the controller and the microprocessor through contact terminals in the lock cylinder for transmission of the coded data, in which the microprocessor includes means for comparing the coded data read from the key means with coded data stored in the coupled memory, and means for enabling the power supply of the key means to power the solenoid when the means for comparing has determined that the coded data from the key means matches the coded data in the coupled memory of the lock.

In another embodiment, the invention includes the use of encryption key codes in the lock unit and in the key unit, each unit encrypting a seed number provided by the lock unit to determine whether the key has been authorized to access the lock. Upon successful access, the encryption key code in the key is overwritten with date stamp information to prevent further access.

In a still further embodiment, the invention includes a novel electronic T-lock device for interfacing with the electronic key device in vending machine applications, wherein the T-lock device provides inventory information to the electronic key device from existing storage memory within the machine.

BRIEF DESCRIPTION OF THE DRAWINGS

The present invention will become more fully understood from the detailed description given hereinbelow and the accompanying drawings which are given by way of illustration only, and are not limitative of the present invention, and wherein:

FIG. 3 is a schematic view of a first embodiment of an electronic key programmer according to the present invention;

FIG. 4 is a schematic view of another embodiment of a portable key programmer according to the present invention;

FIG. 5 is a schematic block diagram of the circuit elements of the electronic key of FIG. 1A;

DETAILED DESCRIPTION OF THE PREFERRED EMBODIMENTS

Figure 1A:
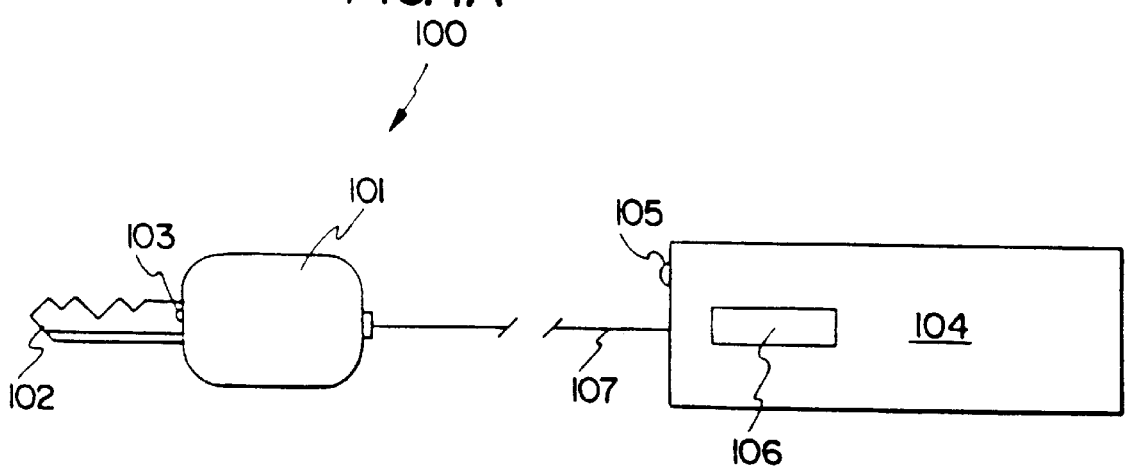
FIGS. 1A and 1B are side and end elevational views, respectively, of an electronic key with its own power supply according to one preferred embodiment of the present invention.
Figure 1B:
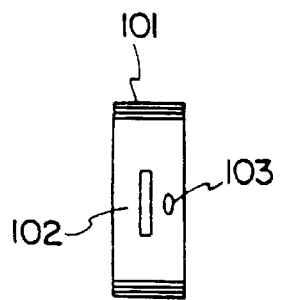

FIGS. 1A and 1B illustrate an electronic key 100 according to a first embodiment of the present invention. The key has a key body 101 which contains logic and power transfer circuitry, and a key blade 102 with appropriately cut key bits for operating pin tumblers as is known in the art. The key 100 also carries a spring loaded data and power electrical contact 103, which is made of a suitable material and is preferably gold plated.

Portable battery and logic housing 104 contains a battery power supply and electronic circuitry, a battery charging port 105, a wrist strap or belt clip 106, and a plug-connected cable 107 for transferring power and data signals between the housing 104 and the key body 101.

FIG. 1B is an end view of the key body showing the orientation of the spring loaded contact 103 with relation to the key blade 102. The key 100 and connected housing 104 with their components are portable and are referred to as "key means".

Figure 2:
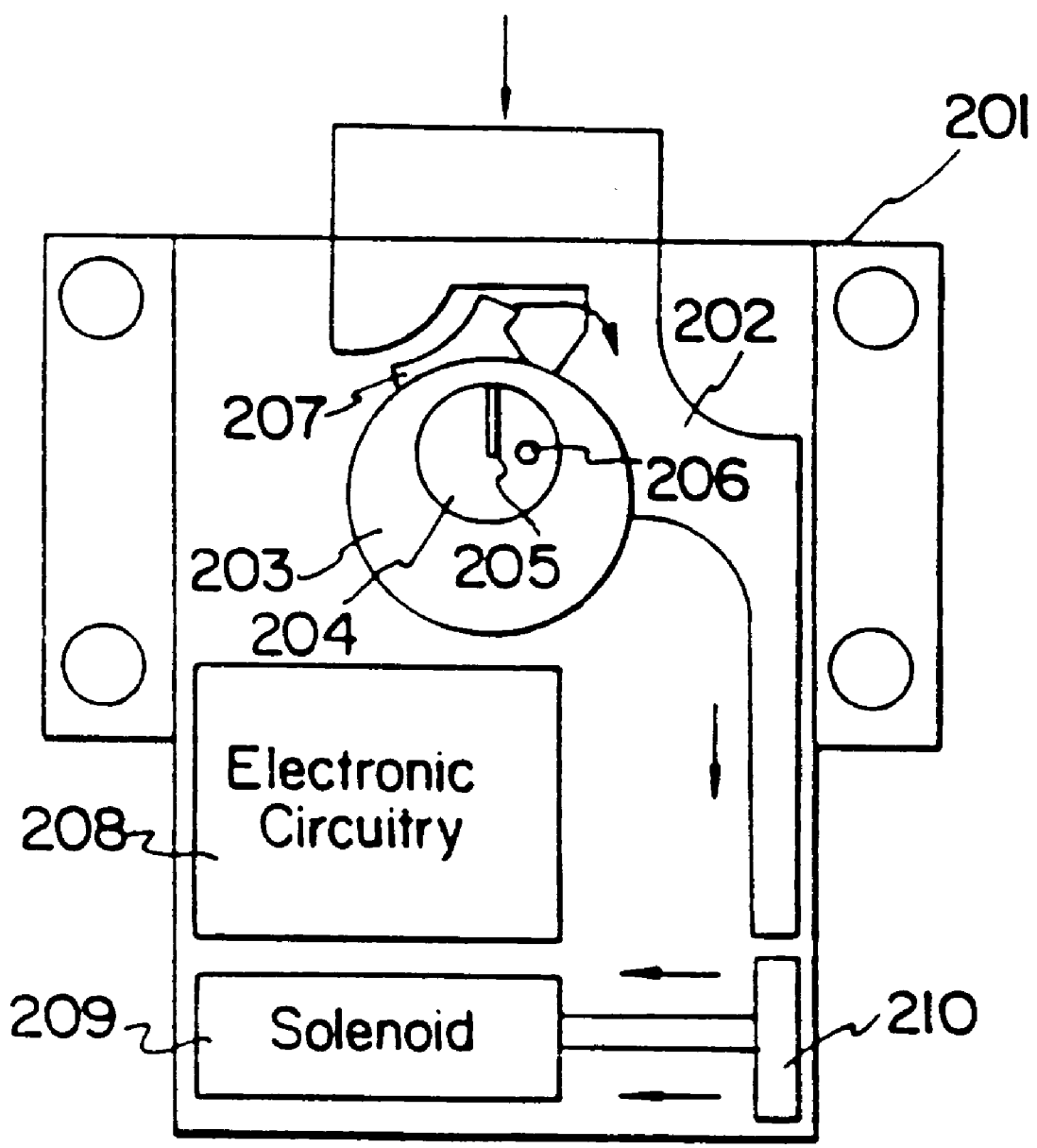
FIG. 2 is a front elevation view of a lock cylinder and associated mechanisms (shown with the housing cover removed) for operation with the key of FIGS. 1A and 1B.

FIG. 2 illustrates a lock cylinder and bolt mechanism according to one embodiment of the present invention, included in a housing 201 (with its cover removed). Within the housing is a bolt 202 operated by a lock cylinder 203 containing a key cylinder plug 204 having a keyway 205 for key blade 102, and an electrical contact 206 which makes contact with the power and data contact 103 of the key body when the key blade 102 is inserted into the key blade opening 205.

A bolt cam 207 is rotated by the lock cylinder 203 to move the bolt 202 between the locked position shown and an unlocked position in which the bolt is withdrawn downward to be substantially within the housing 201. The lock housing 201 further includes electronic logic circuitry 208 and an electrically powered solenoid 209. Solenoid 209 includes a spring biased bolt blocking plunger 210 which, when extended, prevents bolt 202 from being withdrawn by the bolt cam into the housing 201 to its unlocked position. Upon operation of the solenoid 209, bolt blocking plunger 210 is retracted toward the solenoid to enable the key 100 to be turned in the clockwise direction which rotates bolt cam 207 against the bolt 202 and causes the movement of the bolt 202 downward into the housing 201.

FIG. 3 illustrates a programmer for writing data into and reading data from the circuitry in key body 104 through cable 107. The programmer includes a host computer 301 which may be a minicomputer, personal computer, or any other type of computer, but which preferably is an IBM® compatible microcomputer. A key programmer interface unit 302 is connected to the computer 301 by means of a cable 303 which plugs into a communication port of the computer 301. The programmer interface unit 302 contains a key receptacle 304 having electrical contacts into which the plug end of the key cable 107 is inserted after being disconnected from key body 101 to allow the computer to write into the memory within key housing 104. The computer 301 is loaded with a software program 305 for loading and retrieving files from the key logic housing 104.

FIG. 4 illustrates a portable programmer interface unit 401 including a modem which enables the portable programmer interface unit 401 to communicate with the computer 301 through the public switched telephone network (PSTN) via a standard phone jack 402. In this embodiment, an operator in the field needing to update the contents of files in the key housing 104 would dial up the host computer using a standard phone set 403 which is connectable via a jack to the programmer interface 401. Once communication with the host computer 301 is established, the programmer interface unit 401 operates in the same manner as the office programmer interface unit 302.

FIG. 5 is a schematic block diagram illustrating the components within the electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501 as well as the solenoid 209 and the circuitry 208 within the lock mechanism housing 201. The electronic key components further include an electronic switch 505 operated by the controller 501 and a power sensing circuit 506.

Figure 6:
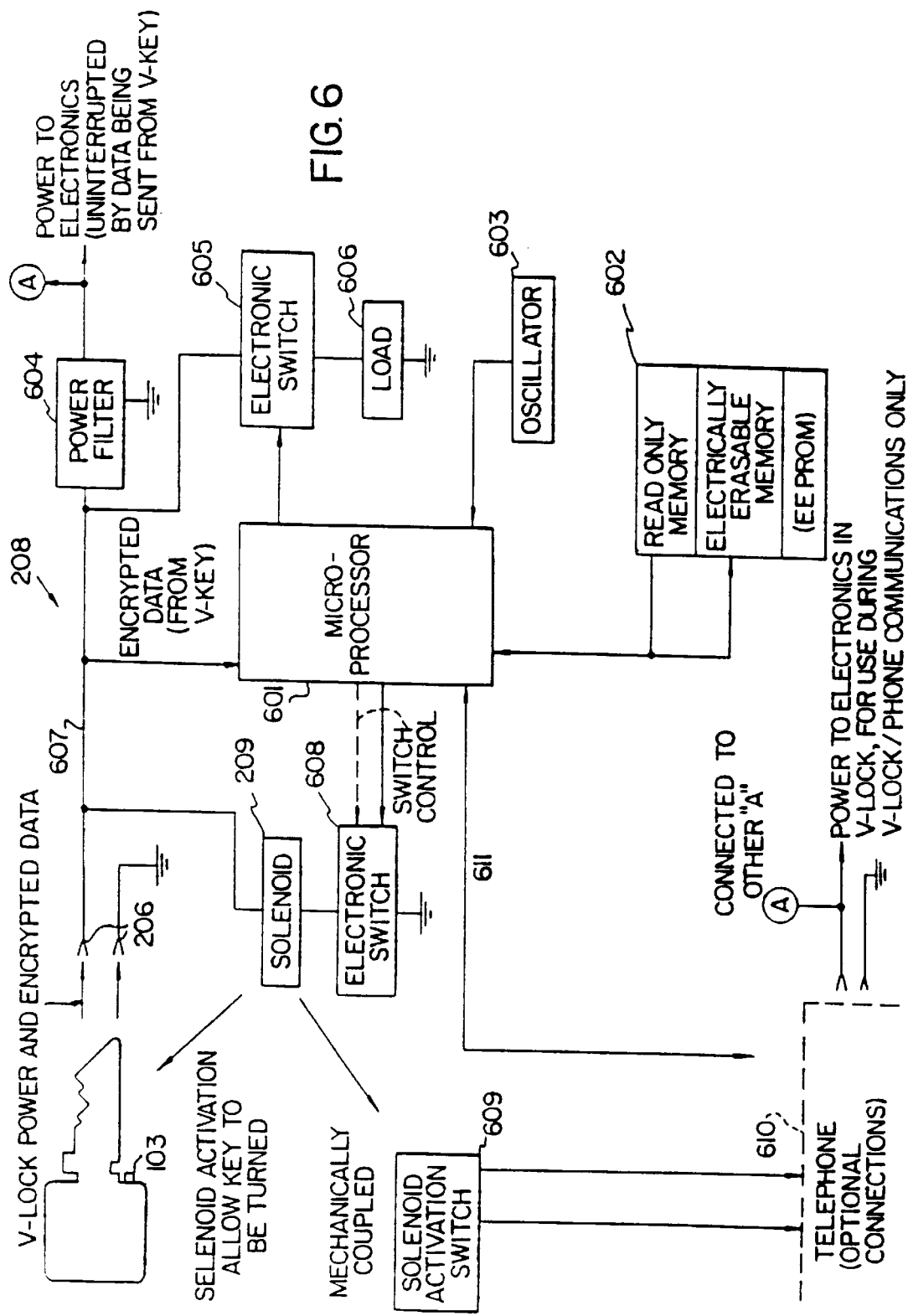
FIG. 6 is a schematic block diagram of the electronic components of the lock mechanism of FIG. 2.

FIG. 6 is a schematic block diagram of the electronic circuitry 208 within the lock housing 201. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103–206 through the solenoid 209 to ground to activate the solenoid.

Figure 7:
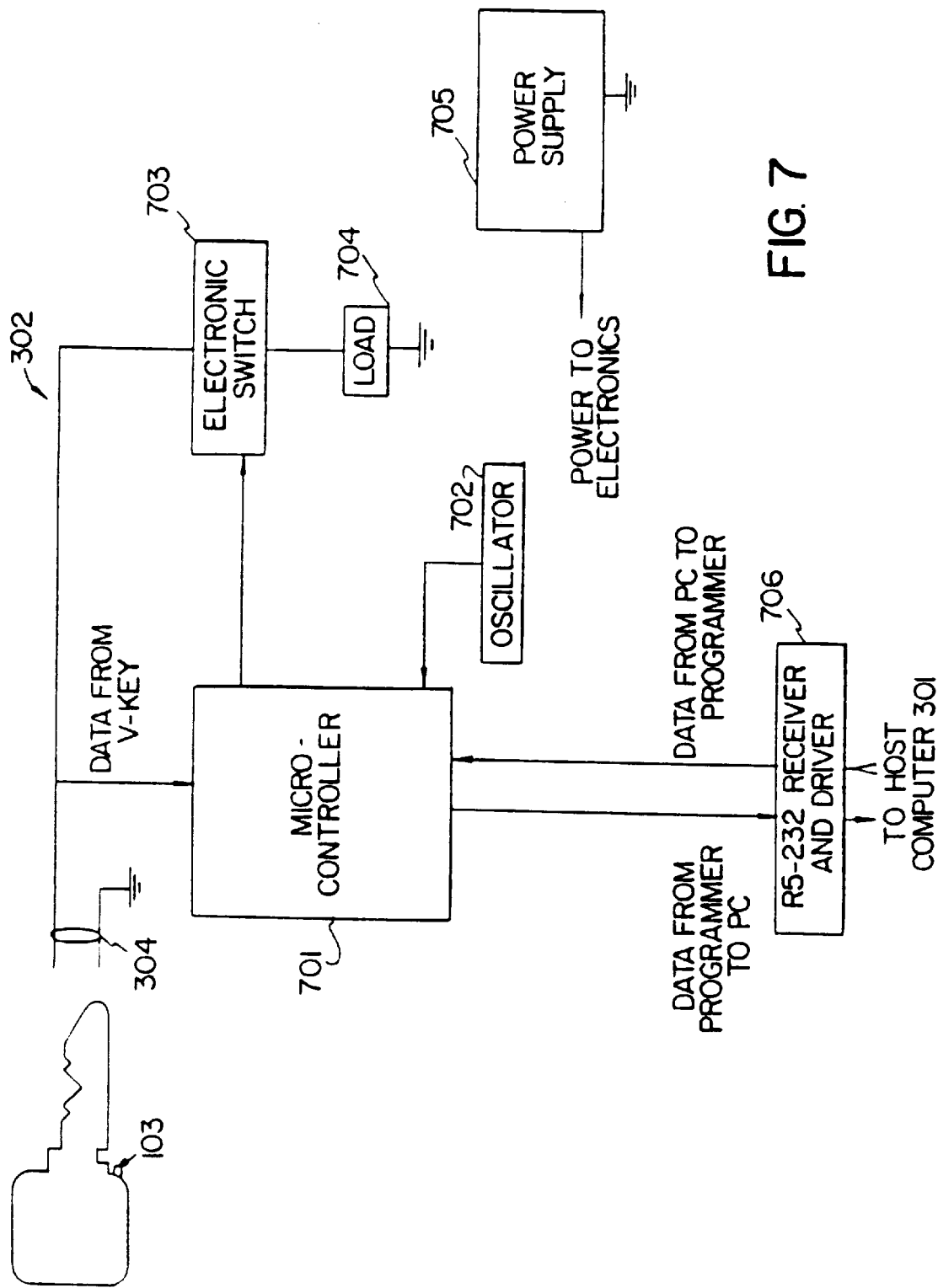
FIG. 7 is a schematic block diagram of the electronic key programmer of FIGS. 3 and 4.

FIG. 7 is a schematic diagram of the electronic key programmer interface unit 302. It is noted that the portable key programmer interface unit 401 contains substantially the same components as the programmer 302, in addition to the modem and telephone jack not shown. The programmer interface unit 302 includes a microcontroller 701, a clock oscillator 702, an electronic switch 703 and load 704 combination which operate similarly to the switch 605 and load 606, a power supply 705, and a standard RS-232 receiver and driver 706 which couples the programmer interface unit 302 to the host computer 301.

The operation of the system components will now be described with reference to FIGS. 5–7.

The electronic key 100 is inserted into the key programmer interface unit 302 or 401 to be programmed by the host computer running the customized software application 305 via cable 107 as described above.

Using the example of a lock for pay telephones for illustration, the EEPROM 502 is loaded with data corresponding to a specific collection route. The data can be entered manually through a keyboard provided with the host computer 301, or the data can be transferred to the EEPROM 502 from files on a floppy disk inserted into a standard floppy disk drive of the computer 301.

EEPROM 502 is loaded with specially encrypted data corresponding to specific ID codes stored in each of the electronic lock memories 602 of the locks on the specific collection route. Data encryption is performed by an encryption algorithm in a known manner. EEPROM 502 also is loaded with the date of key programming, the start date as of which the key is valid, and a time window during which the key can be used, for example, 24, 48 or 72 hours from the start date. EEPROM 502 also contains an address location storing the particular key category, for example, whether the key is a collection key or service key, and a serial number for key identification. The data is encrypted using a specific algorithm performed by the software 305.

The computer 301 may also print out the particular collection route, lock key codes, time window, and start date for confirmation by the programmer.

Controller 501 keeps track of the current time and date by counting the clock inputs of oscillator 503 and using the key programming date as a reference.

The data is written into EEPROM 502 through switching of electronic switch 703 by microcontroller 701 which serves to increase and decrease the amount of power consumed by the load 703 which in turn provides the logic levels for binary "1" and "0" digital communication to the microcontroller 501. This increase and decrease in power is sensed by the power sense circuit 506 and is converted into digital signals readable by the microcontroller 501.

Referring now to FIG. 6, the lock mechanism microprocessor 601 is coupled to EEPROM memory 602 which stores a specific ID code for that specific lock. One important feature of the present invention is that the lock mechanism of FIG. 2 contains no power supply itself but is completely powered by the power source 504 of the electronic key 100. Power filter 604 is provided to supply power to the logic circuits from the key 100 over line 607, the power filter smoothing the voltage waveform so that power interruptions caused by data transmission over line 607 will not affect the operation of the logic circuits.

As an additional security feature, a solenoid activation switch 609 can be mechanically coupled to the bolt blocking plunger 210 of FIG. 2 to detect the retraction of the bolt blocking plunger. In telephones equipped with a so-called "Smart Terminal" or circuit board 610, which is provided with a modem to link the telephone to the host computer over a telephone line, activation switch 609 can be used to send an alarm to the host computer when switch 609 detects the retraction of the bolt blocking plunger in the absence of generation of an enable signal by the microprocessor 601, which would be indicative of someone tampering with the lock by trying to manually pry the bolt blocking plunger away from bolt 202. An additional line 611 may be provided to establish communication between the lock microprocessor and the smart terminal 610.

The use of a smart telephone terminal 610 also allows the use of a host confirmation feature as an additional feature of the present invention. Part of the data stored in the key memory 502 is the key's particular serial number. Using the host confirmation feature, the host computer 301 would dial up the smart terminal 610 via a modem and transmit a host confirmation message to the microprocessor 601. The message may instruct the microprocessor to allow the solenoid 209 to be powered by any mechanically operable key inserted into the key slot 205, may instruct the microprocessor 601 to prevent any key at all from operating the lock by prohibiting powering of the solenoid 209, or may instruct the microprocessor 601 to allow only a key having a particular serial number, transmitted by the host computer, to operate the lock by powering the solenoid. The host confirmation data may then be stored in the memory 602 coupled to the microprocessor 601.

Figure 8:
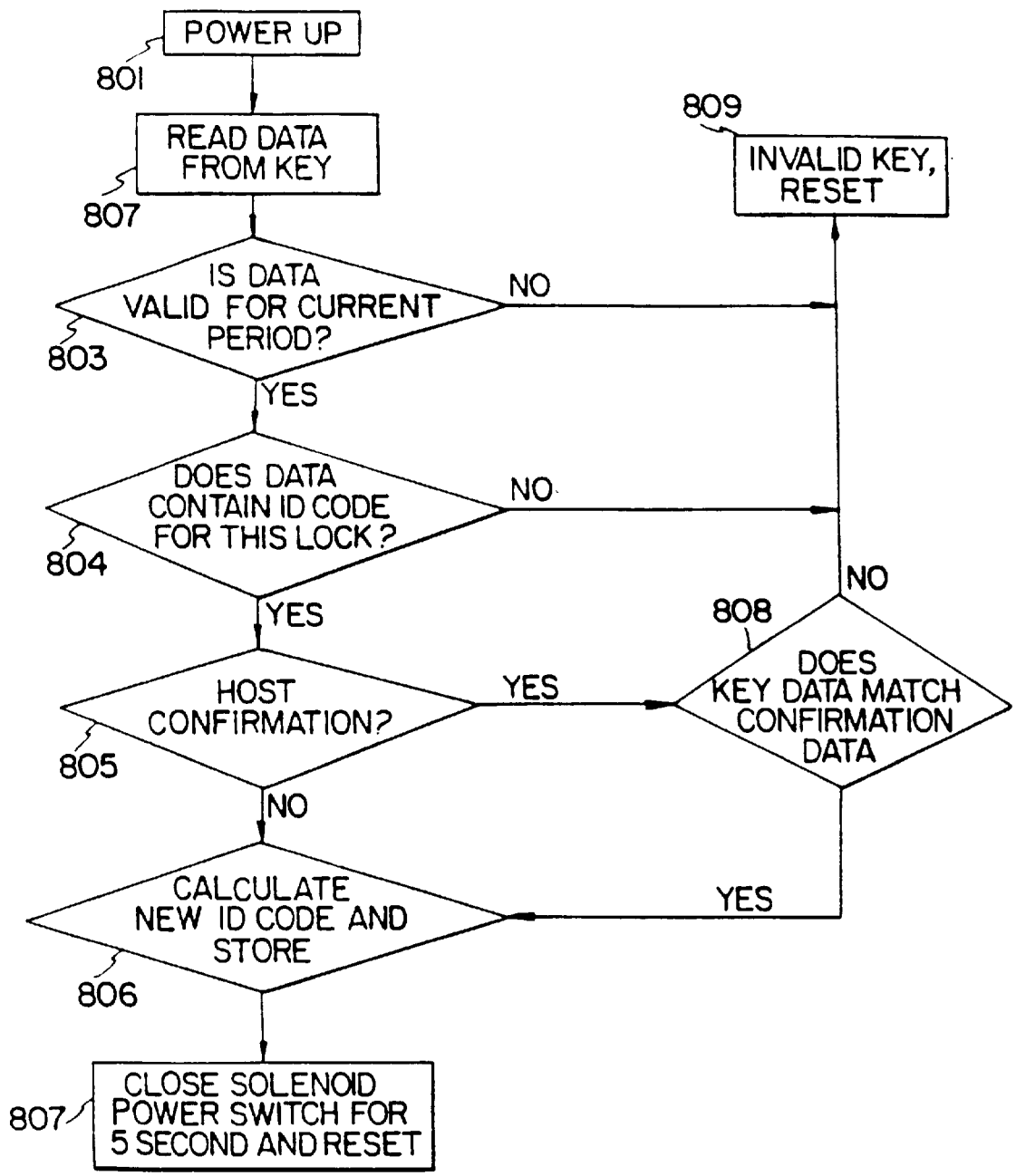
FIG. 8 is an operational flow chart diagram of the electronic lock mechanism operation.

Referring now to FIG. 8, the overall operation of the electronic lock system will be described.

After the key blade 102 is inserted into the keyway 205 and the contact 103 is electrically coupled to the key cylinder contact 206, the electronic lock logic circuitry is powered up or awakened at step 801. At step 802, microprocessor 601 communicates with the microcontroller 501 to read the data stored in the memory 502. At step 803, microprocessor 601 checks whether the current date stored in memory 502 is after the start date written into memory 502 during the programming mode of the key, determines whether the current time read from memory 502 is within the time window stored in memory 502 which has been programmed by the host computer in advance. If the start date read from the key memory is subsequent to the current date read from the key memory, or if the current time is outside of the time window stored in the key memory, the microprocessor advances to step 809 at which the key is determined to be invalid, the microprocessor 601 is reset, and no further action is taken. If the time and date data is valid, the microprocessor 601 proceeds to step 804 in which the list of ID codes stored in key memory 502, corresponding to the locks that key 100 is to operate on this particular collection route, is compared with the current ID code stored in the memory 602. If the ID code in memory 602 is contained in the list stored in memory 502, the process proceeds to step 805 in which the presence of a host confirmation feature is checked. If not, the microprocessor proceeds to step 809. If the telephone is not equipped with a smart terminal 610, processing proceeds to step 806 in which microprocessor 601 calculates a new ID code according to a prestored algorithm in memory 602, encrypts the new ID code and stores it in memory 602, replacing the previous ID code stored therein. At step 807, microprocessor 601 transmits a signal to electronic switch 608 which allows power to flow from power source 504 through solenoid 209, and causes bolt blocking plunger 210 to retract in the direction toward the solenoid 209 for a predetermined period of time such as 5 seconds. At this time, the operator may turn the key body 101 and unlock the bolt. The microprocessor 601 then resets before the key body 101 is withdrawn from the insert slot 205. After the bolt is relocked, the bolt blocking plunger 210 moves back to its blocking position shown in FIG. 2 by spring bias action.

If the coin telephone is one equipped with a smart terminal, processing proceeds from step 805 to step 808. In this step, microprocessor 601 determines whether the key serial number matches the serial number transmitted from the host computer, or whether the host computer has sent a message to prevent all keys from operating. If the key data matches the data stored in the memory 602, processing proceeds to step 806 as described above. If the key data does not match, or microprocessor 601 has received a prohibit message, processing proceeds to step 809.

As an additional feature, each lock may write its serial number and current time into a specific location of the memory 502 of the key in the event that all key data is valid to indicate that the specific lock was operated at the particular time stored with the serial number. Upon return of the key to the central office, the key may be re-inserted into the programmer interface unit 302 and the files in memory 502 read by the host computer in order to maintain a list of the locks that were operated as well as those that were not operated. All of the algorithms utilized by each of the lock microprocessors 601 are stored in the host computer 301 such that after the key is returned at the end of a collection cycle, the key may be reprogrammed with the new ID codes currently being stored in each of the operated locks, while the ID codes for the locks that have not been operated are left unchanged within the key memory 502.

Description will now be made of the second preferred embodiment of the present invention with reference to FIGS. 9–12.

Figure 9:
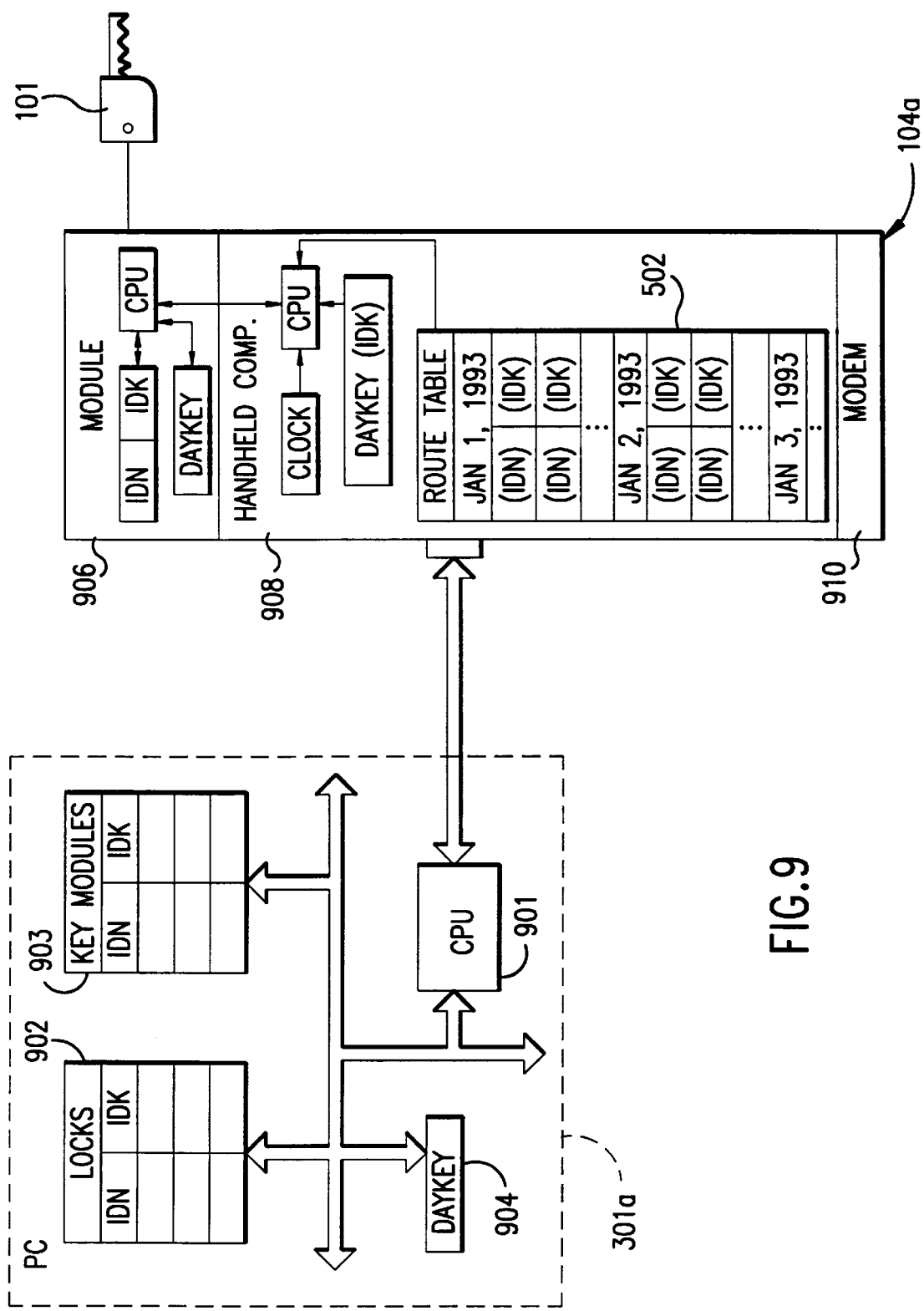
FIG. 9 is a schematic block diagram of an electronic key programmer and an electronic key unit according to a second embodiment of the present invention.

FIG. 9 illustrates a programmer 301a, which may be similar to the microcomputer programmer 301 of FIG. 3. The programmer 301a includes a CPU 901, a pair of look-up tables 902 and 903, and a daykey encrypter 904. Look-up table 902 contains a listing of various IDNs (identification numbers) and IDKs (encryption key codes) for each lock of the system. Every lock is identified by a lock identification number or IDN, and has associated therewith a corresponding encryption key code IDK which is used by the lock to encrypt data.

Look-up table 903 contains a listing of various IDNs and IDKs for each key unit 104a of the system. Each key unit 104a is also identified by a key IDN and has associated therewith a corresponding encryption key code IDK which is used by the key unit to encrypt data.

Daykey encrypter 904 contains an arbitrary encryption key code which is changed daily in the programmer 301a (thus the designation "daykey").

Key unit 104a includes a key module 906, a handheld computer 908, and optionally a modem 910. The module 906 interfaces the handheld computer 908 to the key device 101. Handheld computer 908 is a commercially available device such as a Panasonic Model JT-770, and may be implemented by any other equivalent apparatus. The computer 908 includes a key memory 502 which stores route stop information programmed from the programmer 301a. The route stop information is organized into a route table containing specific routes labeled by date. The key interface module 906 includes the IDN and IDK for the key unit 104a.

In operation, route stops for each collector are compiled by the programmer 301a. These route stops may be selected by a management operator, or may be downloaded into the programmer 301a from a central host management system. For each key unit 104a, which is identified by a particular key module IDN and corresponding encryption key code IDK, the programmer 301a compiles a set of locks which are to be serviced for collection (or other operations) by reading out a number of IDNs and associated IDKs of the locks to be accessed by the particular key unit 104a, from the look-up table 902, to thereby generate a route table for transmission to the key unit 104a.

The IDNS and IDKs of the various locks are encrypted by the encrypter 904 using the particular daykey encryption key code in use on that day. The daykey encryption key code is then itself encrypted using the IDK encryption key code of the specific key unit 104a for which the route table is being compiled. The encrypted daykey, denoted as DAYKEY (IDK), is then also transmitted to the computer 908 of key unit 104a.

In the key unit 104a, the IDN identification number and IDK encryption key code are stored in the key interface module 906, while the encrypted daykey DAYKEY(IDK) and the encrypted route tables are stored in the key memory 502 of handheld computer 908.

Figure 11:
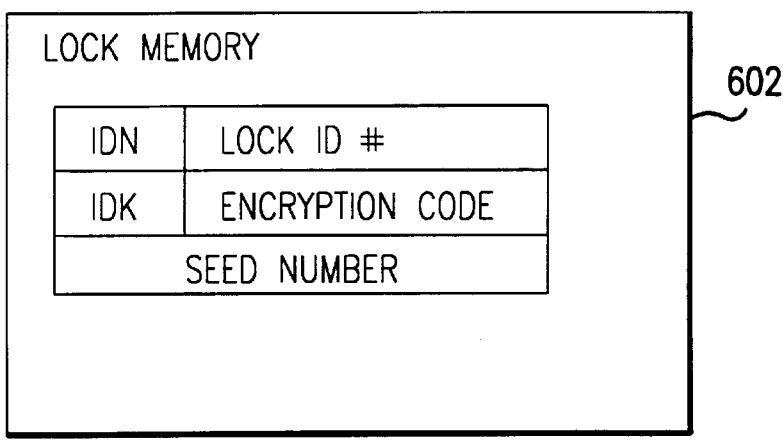
FIG. 11 is block diagram of the contents of lock memory 602 according to the second embodiment of the invention.

Referring now to FIG. 11, the lock memory 602 according to the second embodiment of the present invention contains the IDN or lock identification number of that particular lock, the IDK encryption code associated with that particular lock, and an arbitrary seed number. The seed number is simply a certain numerical value, the actual value of which is not relevant.

In order for the encrypted IDNs and IDKs of the route tables stored in memory 502 to be decrypted, the handheld computer 908 sends the encrypted daykey to the key interface module 906, which decrypts the DAYKEY(IDK) using its encryption key code IDK to obtain the decrypted daykey. The encrypted IDNs and IDKs are then sent to the module 906 to be decrypted using the daykey, and used by the module 906 in the verification process with the lock.

This feature is intended as an additional security measure to achieve an even higher level of security, for the reason that the module 906 is an add-on feature to the computer 908 and is removable therefrom. Thus, in the event that the module is lost or stolen, neither the module nor the handheld computer can be used for access to any information with respect to lock ID codes or encryption key codes. Further, since the daykey encryption code is periodically changed in the programmer, the particular daykey stored in the module 906 is of limited use.

Figure 10:
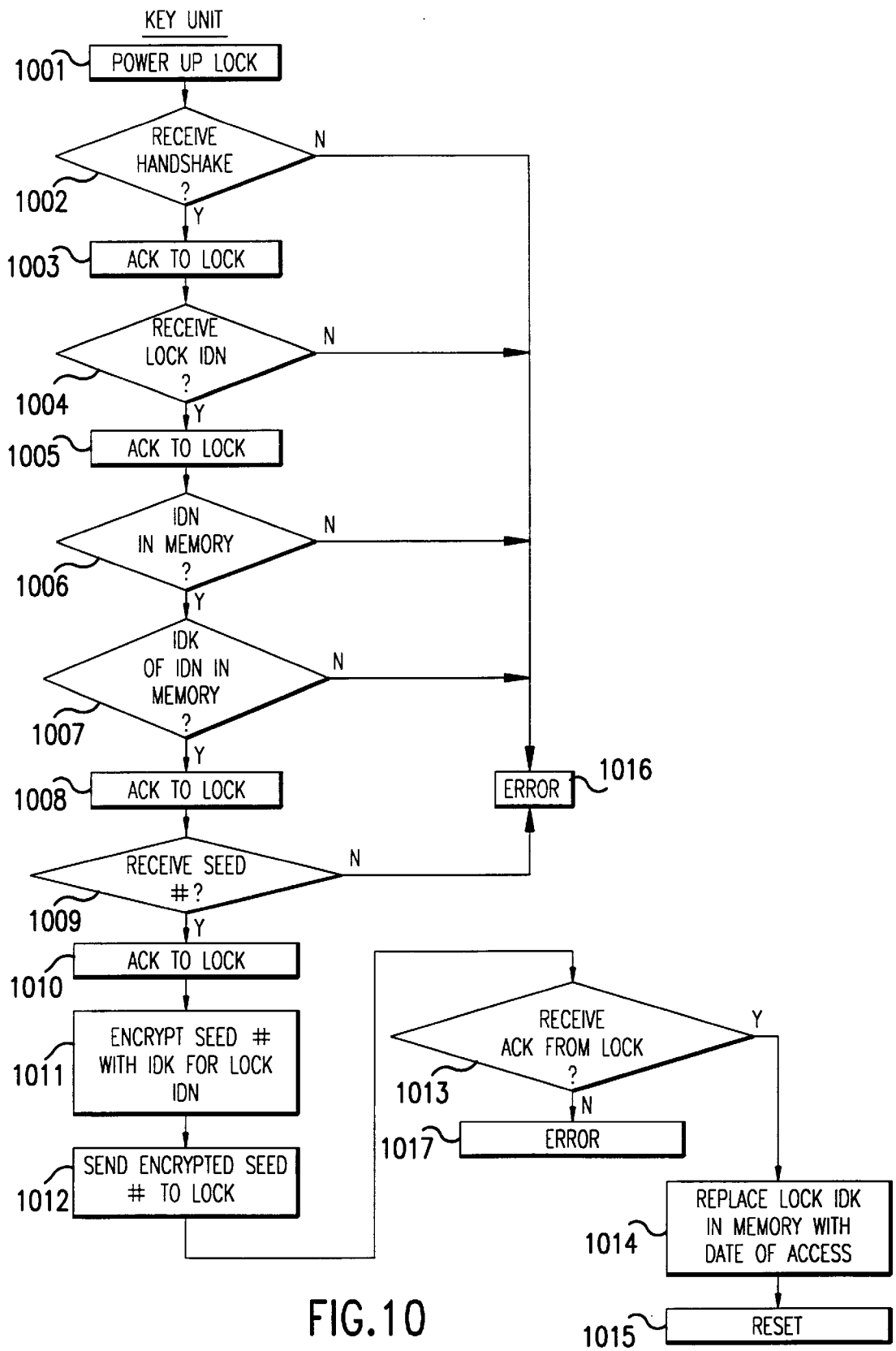
FIG. 10 is a flow chart diagram of the operation of the key unit 104a of FIG. 9.
Figure 10A:
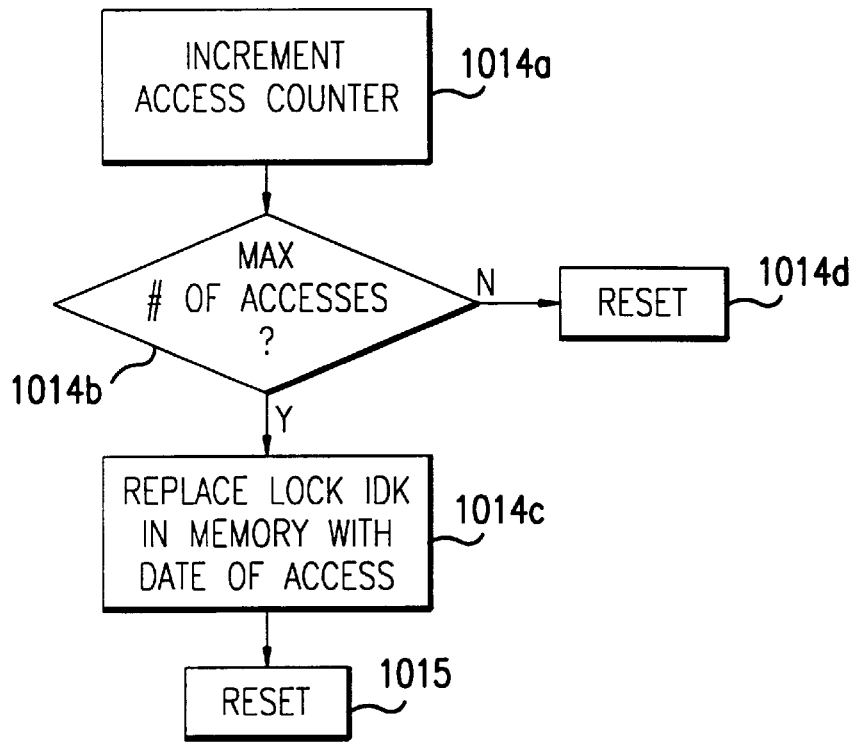
FIG. 10a is a flow chart diagram of an alternative routine for step 1014 of FIG. 10.
Figure 12:
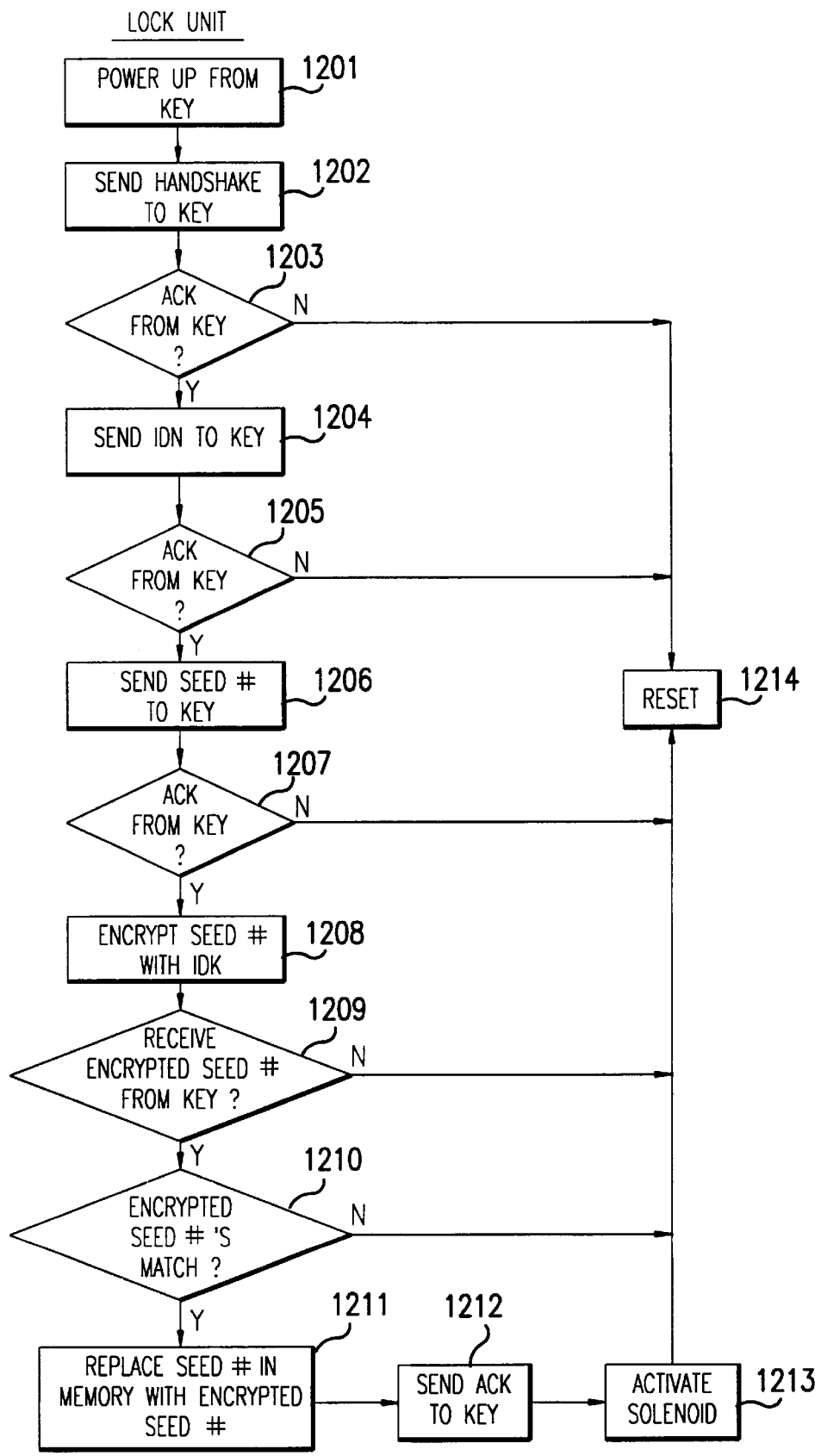
FIG. 12 is a flow chart diagram of the operation of the lock unit 201 according to the second embodiment of the invention.

Operation of the second embodiment will now be described with reference to the flow chart diagrams of FIGS. 10, 10A, and 12.

Upon insertion of the key 101 into the keyway of the lock at step 1001, power is applied to the lock at step 1201. At step 1202, the lock sends a handshake protocol to the key, which receives the handshake at step 1002 and sends an acknowledge to the lock at step 1003. At step 1203, the lock recognizes the acknowledge and sends its IDN to the key at step 1204. The key receives the lock IDN and acknowledges at steps 1004 and 1005, and checks to see whether the lock's IDN exists in memory for the presently valid route table at step 1006. As previously mentioned, the route tables are labeled by date, and the computer 908 includes a clock for keeping track of the current date.

At step 1007, if the IDN is found, the key checks to see if the lock's corresponding IDK is found in memory for the particular IDN sent by the lock and acknowledges the lock if both IDN and IDK have been found, at step 1008. Upon receiving the acknowledge at step 1205, the lock sends the seed number from memory 602 to the key at step 1206. The key acknowledges receipt of the seed number at step 1010, and the lock then encrypts the seed number with its IDK at step 1208 upon receiving the acknowledge at step 1207.

The key also encrypts the seed number from the lock at step 1011, using the IDK found for the IDN received from the lock. At step 1012, the key sends the encrypted seed number to the lock, which receives it at step 1209. The lock then compares the encrypted seed number received from the key with the encrypted seed number which the lock itself generated, at step 1210. If the numbers match, the key is determined to be authorized to access the lock. At step 1211, the key writes the encrypted seed number into the memory 602 over the old seed number. The encrypted seed number will be used as the new seed number for the next access request from a key. At step 1212, the lock sends an acknowledge to the key to inform it of a successful access request, and activates the solenoid at step 1213. The lock then resets at step 1214. If any of the acknowledges from the key are not received within a predetermined amount of time, the lock routine also advances immediately to step 1214 for reset.

Upon receiving the acknowledge from the lock at step 1013, the key unit writes the date of access into the route table at step 1014, over the IDK previously stored there. As such, the key unit will thereafter not be able to access the lock without being reprogrammed by the programmer 301*a*. Such can be accomplished either by bringing the key unit 104*a* back to the management center, or by calling into the programmer via modem 910 for reprogramming in the field.

The key unit then proceeds to step 1015 where it is reset for the next lock access attempt.

In an alternative mode of operation, the key unit may be programmed to have a set number of accesses to each lock before requiring reprogramming. Such is shown in FIG. 10A, wherein a counter is incremented at step 1014*a*, and the value stored in the counter is compared with a preset maximum number of accesses at step 1014*b*. If this number has been reached, the lock IDK is replaced by the date of access and the key unit is reset at steps 1014*c* and 1015; otherwise the key unit is immediately reset at step 1014*d*. In either event, additional access to the lock may be denied upon an attempted access to another lock.

Figure 13:
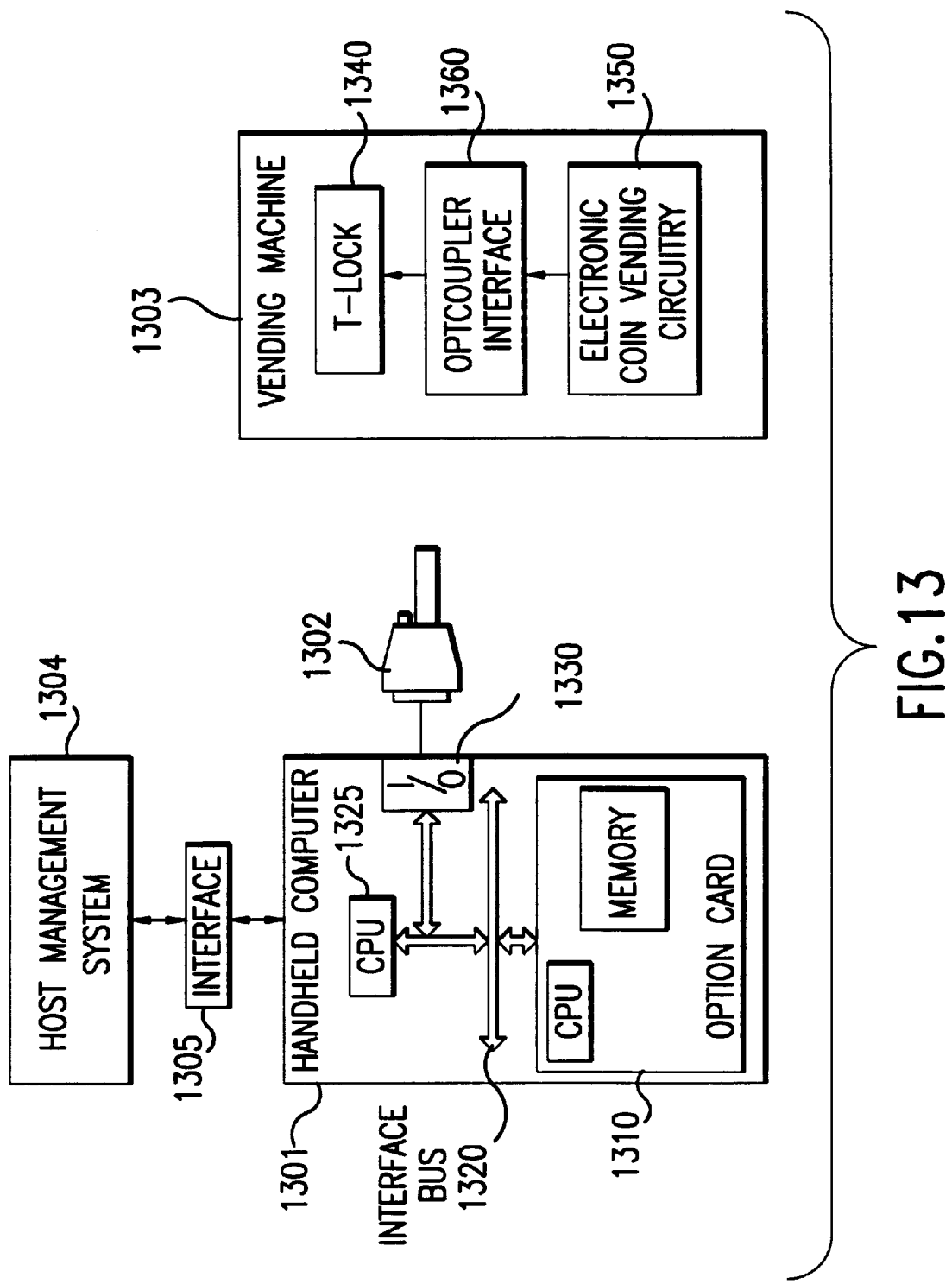
FIG. 13 is a block diagram of an electronic security system according to a third embodiment of the invention, relating to T-handle type vending machines.

FIG. 13 illustrates an electronic security system according to a third embodiment of the present invention, relating to T-handle lock type vending machines such as snack and beverage machines, newspaper machines, gaming devices such as slot machines, stand alone lottery machines, money loaders for ATMs (automated teller machines), and transit system farecard machines.

In this embodiment, a portable, conventional handheld computer (HHC) 1301 is provided with an internal circuit board or option card 1310, having a CPU, memory and associated firmware or software. The option card is installed either as a built-in daughter board or may be inserted into an existing option slot in the HHC 1301, and communicates with the CPU 1325 of the HHC through an interface bus 1320. The option card 1310 of FIG. 13 replaces the add-on module 906 of the embodiment of FIG. 9 and generally performs the same functions as the module 906. As such, further description of the operation of the option card 1310 will be omitted to eliminate repetition. The HHC 1301 is connectable to a host management system 1304 through an interface 1305. An electronic key device 1302 is connected to the HHC 1301 through an input/output (I/O) port 1330 of the HHC. The option card 1310 communicates with electronic T-lock device 1340 of vending machine 1303 through the I/O port 1330 of the HHC, to transfer decrypted ID code data therebetween and thus provide access to the vending machine. Key device 1302 is similar to key device 101 of FIG. 1A.

The HHC 1301 is used to access vending machine 1303. The vending machine includes a novel electronic T-lock device 1340 (to be described in detail below). The electronic T-lock device 1340 communicates with the HHC 1301 via the key device 1302, which supplies power to the T-lock device as in the first and second embodiments. Electronic T-lock device 1340 also communicates with electronic coin vending circuitry 1350 through optocoupler interface 1360. The electronic coin vending circuitry 1350 includes a memory for maintaining information regarding the amount of money deposited in the vending machine, inventory information relating to the different types and quantities of merchandise sold and still on hand, and other pertinent information relating to the operation of the vending machine. The electronic coin vending circuitry 1350 is conventionally known in the art and for this reason will not be further described. The optocoupler interface consists of LED and optotransistor circuitry and is also well known in the art. The optocoupler interface 1360 enables existing vending machines to be retrofitted with novel electronic T-lock devices 1340 by providing isolation coupling between the existing coin vending circuitry and the T-lock device, to avoid any possible damage due to voltage incompatibility between the components. The optocoupler interface 1360 allows inventory data to be transferred from the vending machine circuitry 1350 to the handheld computer 1301 where it is stored in memory. While optocoupling circuitry is used in the preferred embodiment, it is noted that other types of interfacing including hardwiring may be used in the invention with equivalent function.

One advantage of the present invention lies in the ability of the HHC 1301 to download inventory data from the vending machine 1303 by simply inserting the key device 1302 into the T-lock device 1340. Upon successful transfer of coded security information, the T-lock will retrieve inventory data from the vending circuity 1350 and transfer it to the HHC 1301. Service personnel may then read the inventory information from the HHC display, allowing the servicer to determine the quantities and types of inventory that require restocking in the vending machine, without requiring the servicer to open the machine to either access the coin vending circuitry, or to visually inspect the inventory, thus saving considerable time and enhancing convenience. The inventory data may also be uploaded to the host management system 1304 along with the route collection data as described previously, for use by management. The access protocols between the HHC 1301 and the T-lock device 1340 are the same as shown in FIGS. 10 and 12.

Figure 14:
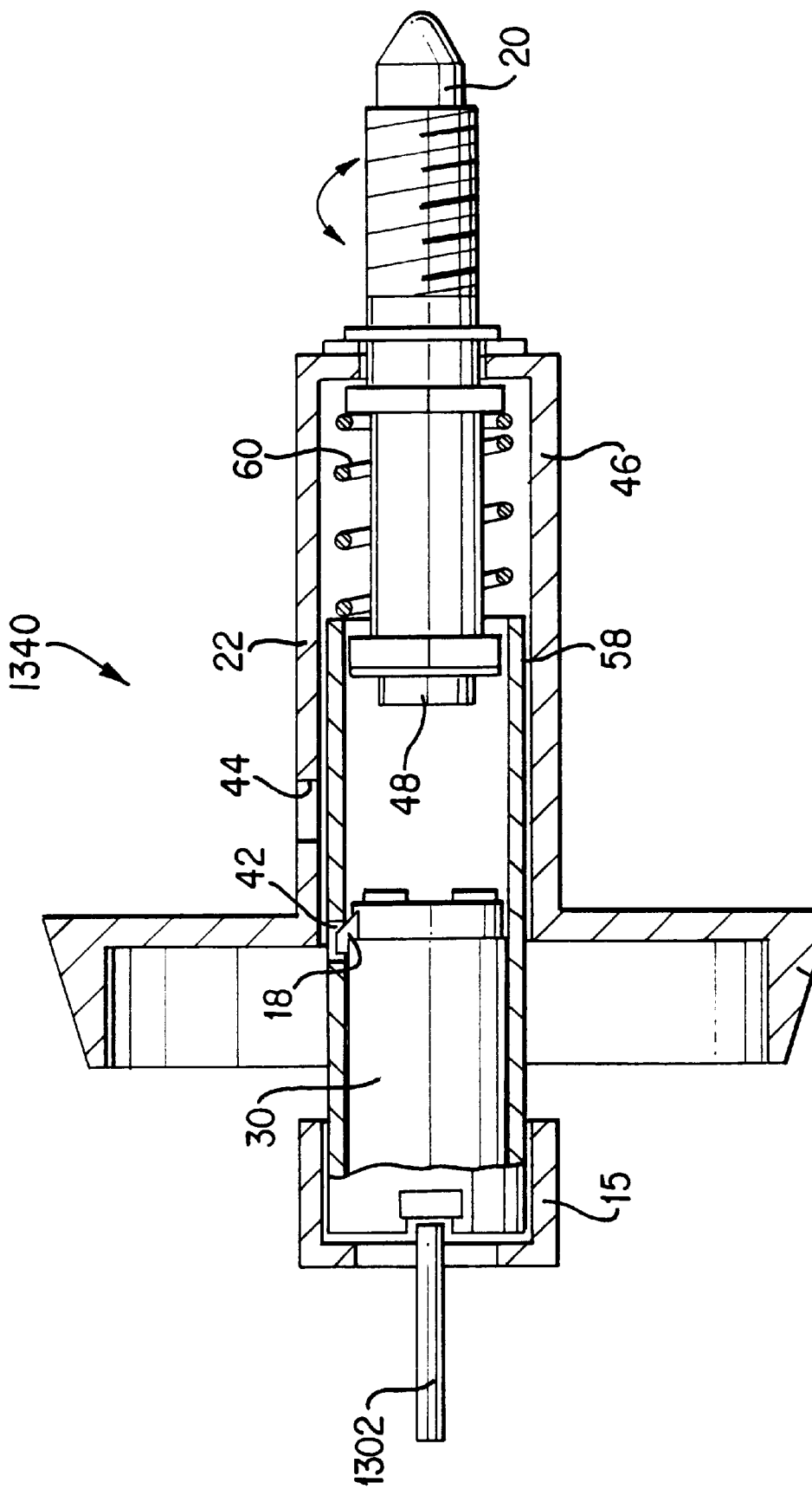
FIG. 14 is a partly cross sectional side view of a T-handle lock assembly to which the third embodiment of the invention is applicable.

FIG. 14 illustrates a mechanical T-lock assembly which is used in conjunction with the novel electronic T-lock device of the present invention. The mechanical aspects of the T-lock assembly are disclosed in U.S. Pat. No. 5,038,588, assigned to the assignee of the present invention and incorporated herein by reference.

In general, a locking mechanism 30 having a bolt 18 is mounted within a cylinder/extension rod housing 22. A threaded extension rod 20 is mounted in the housing at the other end thereof and is secured within the housing by means of a head 48 and teeth 58 which mate with corresponding cam means in the end of the housing 22. The lock assembly of FIG. 14 is shown in its unlocked position in which bolt 18 is retracted from engagement with an opening 44 a hollow shank portion 46 in T-handle housing unit 16. Bolt 18 is engageable with opening 44 through an aperture 42 in the cylinder/extension rod housing 22. Upon retraction of the bolt 18 from the opening 44, spring 60 forces the end of the housing 22 into engagement with the teeth 58. Front handle 15 thus pops out of its nested position within housing 16 and allows the extension rod 20 to be unscrewed from its complementary threaded section within the vending machine. The T-lock device 1340 is mounted within a door or access panel of the machine or box with which it is associated, and thus unscrewing of the extension rod 20 allows the interior of the vending machine or other type of box to be accessed. Key device 1302 is inserted into a keyway of locking mechanism 30 and is turned in order to retract bolt 18 from engagement with opening 44.

Figure 16:
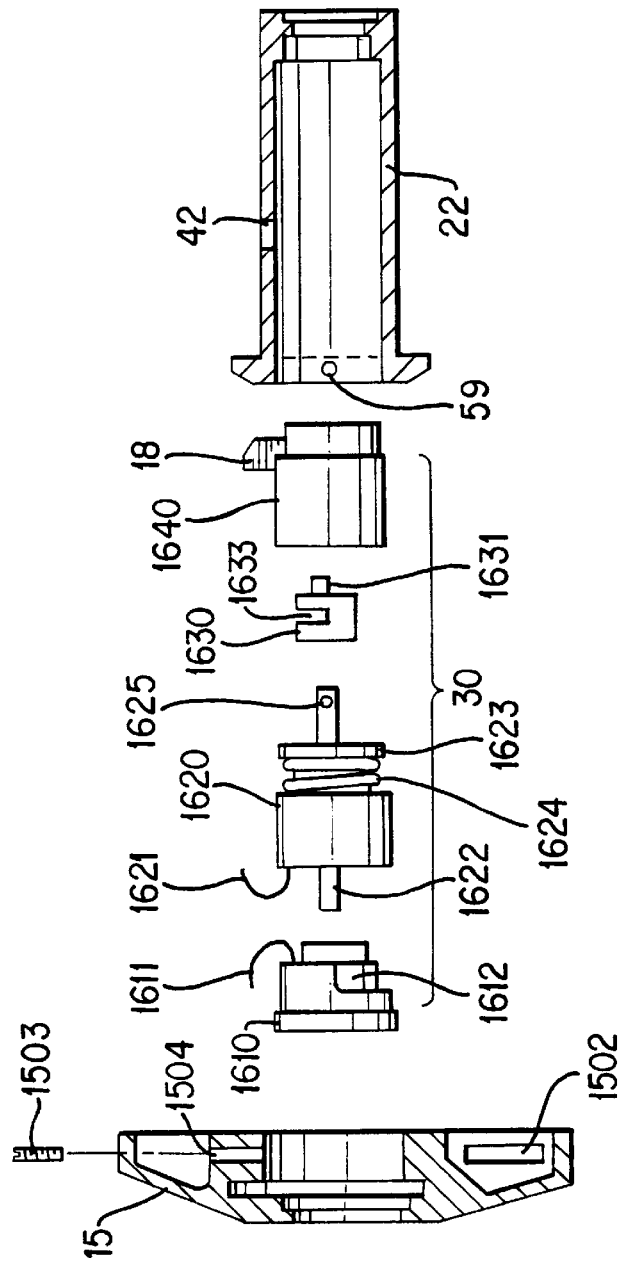
FIG. 16 is an exploded partly cross sectional side view of a cylinder front handle, cylinder/extension rod housing subassembly, and novel bolt release assembly according to the third embodiment of the invention.
Figure 17C:
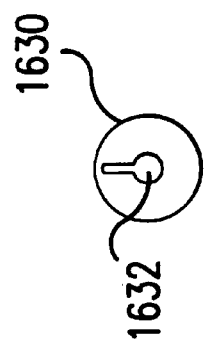
FIG. 17C is a front view of bolt cam 1630 of FIG. 16.
Figure 17F:
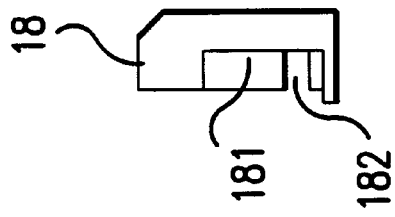
FIG. 17F is a side view of bolt 18.
Figure 17B:
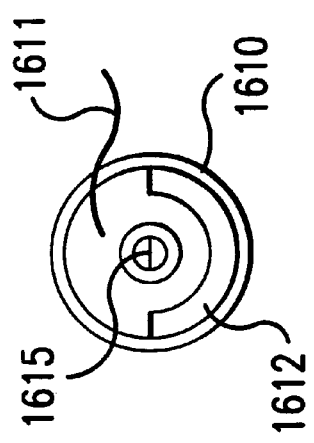
FIG. 17B is a rear view of plug assembly 1610.
Figure 17E:
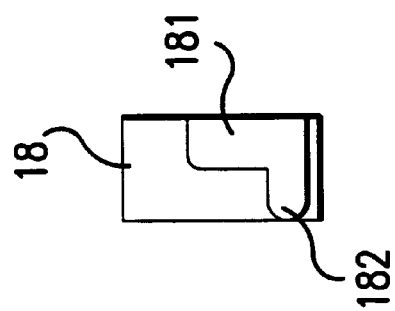
FIG. 17E is a front view of bolt 18 of FIG. 16.
Figure 17A:
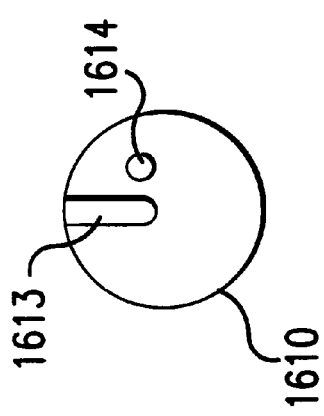
FIG. 17A is a front view of plug assembly 1610 of FIG. 16.
Figure 17D:
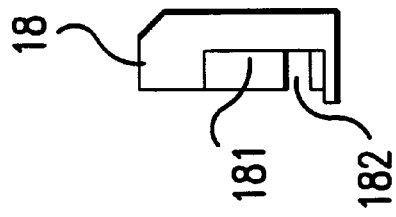
FIG. 17D is a rear view of bolt cam 1630.

FIG. 16 illustrates the constituent parts of the novel electronic T-lock device and the locking mechanism 30. Bolt 18 is mounted in bolt housing 1640. The bolt 18 may be a spring-loaded bolt or a deadbolt. Bolt 18 includes a channel 181 and a cam slot 182 as shown in FIGS. 17E and 17F. Bolt cam 1630 is mounted within bolt housing 1640, and includes a cam pin 1631 which engages within the channel 181 and rests within slot 182 as the bolt 18 is being retracted through rotation of the key. FIGS. 17C and 17D respectively show a front and rear view of the bolt cam 1630. As shown, bolt cam 1630 includes a teardrop slot 1632, and a 180° slot 1633.

Figure 15:
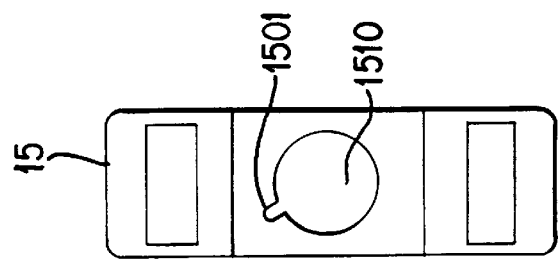
FIG. 15 is a front view of the cylinder front handle 15 of FIG. 14.

The bolt cam 1630 is engaged by shaft 1622 of armature 1623. Shaft 1622 has a projection 1625 at the end thereof adjacent the bolt cam 1630. The shaft 1622 and projection 1625 fit into the teardrop slot of the bolt cam 1630. The armature 1623 is mounted within solenoid 1620, and is normally biased toward the bolt cam by a spring 1624. Spring 1624 forces the shaft 1622 fully within the bolt cam so that the projection 1625 is located within 180° slot 1633. The other end of the shaft 1622 is slotted along the edge thereof; this slot engages with chamfer 1615 of plug assembly 1610, as shown in FIG. 17B. Plug assembly 1610 has a keyway 1613 and a data contact terminal 1614 at the front end thereof, as shown in FIG. 17A. A 180° channel 1612 is provided on the back end of plug assembly 1610. This channel interacts with a roll pin 59 which projects into the interior of housing 22 when the plug assembly is mounted therein. An alignment slot 1501 is provided in opening 1510 of front handle 15, as shown in FIG. 15, to ensure that the plug assembly, and thus projection 1625, is properly aligned with the teardrop slot 1632, by requiring the keyway 1613 to be aligned with the alignment slot 1501 in order for the key device 1302 to be inserted into the keyway. Tabs on the end of housing 22 engage with a vertical slot in front handle 15, and the housing 22 is rigidly secured to the front handle by means of a set screw 1503 which is threaded through thread hole 1504 in handle 15. The electronic lock circuit as shown in FIG. 6 is formed on an IC chip 1502 which is mounted within a hollowed out section of front handle 15. Wire contacts 1611 connect the data/power contact terminal 1614 to the IC chip 1502 and power terminals 1621 connect the solenoid 1620 to the IC chip 1502. Additional wiring (not shown) connects the IC chip to the optocoupler interface 1360.

In operation, when the solenoid 1620 is unenergized, the spring 1623 forces the projection 1625 into the 180° slot 1633 of the bolt cam. Thus, insertion of a key or other instrument in keyway 1613 will allow the plug assembly 1610 and armature 1623 to be freely rotated 180° without engaging the bolt cam to retract the bolt 18. Upon the proper transfer of decrypted ID code data from the HHC to the lock circuit 1502, the lock circuit allows power to be transmitted to the solenoid 1620, drawing the armature 1623 in toward the solenoid. In this position, the projection 1625 engages with the teardrop slot 1632, and rotation of the key 1302 will thus rotate the bolt cam 1630 causing the bolt 18 to retract and providing access to the vending machine.

While the disclosed T-lock assembly uses a threaded extension rod, this is not critical to the operation of the invention, and other equivalent attachment mechanisms for securing the T-lock to the housing enclosure such as ratchets, latches, pins, etc. may be used equivalently according to the invention.

The invention being thus described, it will be apparent to those skilled in the art that the same may be varied in many ways without departing from the spirit and scope of the invention. Any and all such modifications are intended to be included within the scope of the following claims.

What is claimed is:

1. An electronic security system, comprising:
    a lock, including means for unlocking said lock based on received specific data; and
    key means for operating said lock, comprising
        a handheld computer including means for storing encoded data, and
        an internal circuit board installed within said handheld computer for interfacing said handheld computer with said lock, including means for decoding said encoded data stored in said handheld computer into decoded data and means for generating said specific data for transmission to said lock based on said decoded data.

2. An electronic security system according to claim 1, further comprising a key device coupled to said internal circuit board via an I/O port of said handheld computer, said key device being insertable into said lock and providing operative power to said lock from said handheld computer, providing data to said lock from said handheld computer, and providing data from said lock to said handheld computer.

3. A lock mechanism, comprising:
    a bolt movable between a locked position and an unlocked position;
    a bolt cam contacting said bolt and moving said bolt between said locked position and said unlocked position through rotation of said bolt cam;
    shaft means selectively engageable with said bolt cam for rotating said bolt cam;
    plug means connected to said shaft means for rotating said shaft means, said plug means having a keyway for insertion of key means for rotating said plug means;
    solenoid means for drawing said shaft means into active engagement with said bolt cam upon energization of said solenoid means so that said bolt cam may be rotated by said shaft means; and
    access means for selectively energizing said solenoid means;
    wherein said shaft means is passively engaged with said bolt cam so as to rotate without rotating said bolt cam when said solenoid means is not energized.

4. A lock mechanism according to claim 3, wherein said shaft means includes a projection on an end thereof, said bolt cam includes a channel within which said projection rotates without engaging said bolt cam when said shaft means is passively engaged with said bolt cam, and said bolt cam further includes a teardrop slot within which said projection engages said bolt cam for rotating said bolt cam when said shaft means is actively engaged with said bolt cam.

5. A lock mechanism according to claim 3, wherein said access means comprises means for receiving data from said key means, means for determining whether data received from said key means is authorized data, and means for energizing said solenoid means when data received from said key means is determined to be authorized data.

6. A lock mechanism according to claim 5, further comprising:
    an extension rod;
    an elongated housing assembly for housing therein said extension rod, said bolt, said bolt cam, said shaft means, said solenoid means, and said plug means; and a front handle coupled to said elongated housing assembly and having a recess formed therein, said access means being located within said recess, said front handle being released to an operative position for rotating said extension rod when said bolt is in said unlocked position.

7. An electronic security system, comprising:

a lock, including
- a bolt movable between a locked position and an unlocked position,
- a bolt cam contacting said bolt and moving said bolt between said locked position and said unlocked position through rotation of said bolt cam,
- shaft means selectively engageable with said bolt cam for rotating said bolt cam,
- plug means connected to said shaft means for rotating said shaft means, said plug means having a keyway for insertion of key means for rotating said plug means,
- solenoid means for drawing said shaft means into active engagement with said bolt cam upon energization of said solenoid means so that said bolt cam may be rotated by said shaft means, and
- access means for selectively energizing said solenoid means in response to received specific data,
- wherein said shaft means is passively engaged with said bolt cam so as to rotate without rotating said bolt cam when said solenoid means is not energized; and
key means for operating said lock, comprising
- a handheld computer including means for storing encoded data, and
- an internal circuit board installed within said handheld computer for interfacing said handheld computer with said lock, including means for decoding said encoded data stored in said handheld computer into decoded data and means for generating said specific data for transmission to said lock based on said decoded data.

8. An electronic security system according to claim 7, wherein said lock is installed in a vending machine having internal memory circuitry which stores inventory information therein;

said lock further comprising interface means for coupling said access means with said internal memory circuitry, said access means reading said inventory information from said internal memory circuitry and transmitting said inventory information to said handheld computer through said key means.

9. An electronic security system, comprising:

electronic lock means, installed in a vending machine, said vending machine having internal memory circuitry which stores inventory information therein, for providing selective access to said vending machine, and including means for receiving data and means for transmitting data;

interface means for coupling said internal memory circuitry of said vending machine to said electronic lock means and providing said inventory information to said means for receiving data; and electronic key means for operating said electronic lock means to access said vending machine, including memory means for receiving said inventory information from said means for transmitting data in said electronic lock means.

10. An electronic security system according to claim 9, wherein said electronic key means includes a key having a data contact, and said electronic lock means includes plug means having a terminal for contacting said data contact of said key through which said inventory information is transmitted to said memory means of said electronic key means.

* * * * *